3,470,040
THIXOTROPIC LIQUID PROPELLANT COMPOSITIONS WITH SOLID STORAGE CHARACTERISTICS

William B. Tarpley, Jr., West Chester, Pa., assignor to Aeroprojects Incorporated, West Chester, Pa., a corporation of Pennsylvania
No Drawing. Filed Sept. 30, 1959, Ser. No. 844,607
Int. Cl. C06b 19/04; C10l 7/02; C06d 5/00
U.S. Cl. 149—1     3 Claims This invention relates to inorganic liquid propellant compositions and methods of production thereof.

Inorganic liquid propellants are fluids whose chemical and thermodynamic changes under appropriate conditions are utilized to produce backward momentum in order to provide forward thrust to a device such as a rocket. Several types of these fluids are known, such as liquid fuels, liquid oxidizers, and liquid monopropellants.

In considering the suitability of a particular propellant, consideration must be given not only to its performance characteristics and its availability but also to such factors as safety, stability, and ease of handling.

Liquid hydrogen and liquid oxygen, for example, have low boiling points which render them subject to such evaporation difficulties as to make them incapable of being stored for more than two to three days even when in special tanks; this vaporizing tendency also contributes to vapor-locking in pumping systems, while the low-temperature properties of these materials produce brittleness in pumps and pipelines.

Furthermore, all liquid propellants are subject to inconvenient spillage, whether through tank-penetration from the outside or otherwise, a spillage which is also hazardous especially in connection with the highly reactive materials.

Moreover, there exists a problem in connection with the addition of desirable solid substances to liquid fuels or liquid oxidizers, these substances generally being of greater or lesser density than the liquid, such as the addition of solid oxidizer particles to liquid oxidizers or of solid fuel particles to liquid fuels. These density differences produce rapid settling even of the finest particulate solids available. Also, mechanical stirring sometimes produces dispersions containing agglomerated and clumped material, causing such dispersions to settle rapidly. Likewise, desirable monopropellant compositions have not been prepared because of the difficulty in suspending particulate high-energy fuels in liquid oxidizers or particulate high-energy oxidizers in liquid fuels.

This invention has as an object the provision of novel inorganic liquid propellants.

This invention has as another object the provision of a novel method for making inorganic liquid propellants.

This invention has as yet another object the provision of inorganic liquid propellants having good storage, pumping, and metering characteristics.

Other objects will appear hereinafter.

By "inorganic" as used herein is meant a chemical compound which does not contain carbon, except as a carbonate or cyanide.

The inorganic liquid propellants of the present invention are essentially unpourable, i.e., gels or gel-like, under storage or low shear conditions. Such materials, if spilled, will remain in a mass rather than splashing and running as would the conventional inorganic liquid propellants. Furthermore, because the apparent viscosity under conditions of low or zero flow is extremely high, the rate of Stokes settling of suspended particulate matter is negligible. However, when modest to rapid flow is initiated as by pressure or by pumping, the apparent viscosity will become lower, i.e., the composition will exhibit shear thinning, and under high shear conditions the apparent viscosity will reduce to nearly that of the conventional propellant fluids. The inorganic liquid propellant compositions of the present invention, therefore, have the desirable storage characteristics of solid materials but can be induced to flow like liquids when desired by the application of sufficient shear.

The inorganic liquid porpellant compositions of the present invention comprise a major weight proportion of an inorganic liquid propelling agent and a minor weight proportion of a gellant, which gellant does not appreciably adversely affect the propelling properties of the propelling agent and is not destroyed by that agent. As aforesaid, the inorganic propelling agent may comprise an inorganic liquid or it may comprise an inorganic liquid containing particles, i.e., a slurry. With those inorganic liquid propellant compositions of the present invention which include solid particles, there is the added advantage, in addition to the flow behavior, of prevention of settling of the solid particles. In addition, the inorganic liquid propellant compositions of the present invention may include additives which aid in the blending between the propelling agent and the gellant, such as surface active agents and the like.

The inorganic liquid propellant compositions of the present invention, as above indicated, may include a wide variety of propelling agents, such as liquid fuels (including hydrazine, liquid ammonia, etc.); liquid fuels containing high-energy solid fuels (the solid fuels being such materials as finely-divided aluminum, magnesium, magnesium hydride, etc.); liquid monopropellant fuels (containing particles of solid oxidizers such as ammonium perchlorate, ammonium nitrate, lithium perchlorate, etc.); liquid oxidizers (such as red fuming nitric acid, chlorine trifluoride, etc.); liquid oxidizers containing particles of high-energy solid oxidizers; and liquid monopropellant oxidizers (containing particles of high-energy fuels, coated if necessary to retard activity).

A wide variety of gellants may be utilized in the inorganic liquid propellant compositions of the present invention. It is essential that the resultant composition of liquid propelling agent and gellant exhibit the flow behavoir above described. It is likewise essential that the gellant be compatible with the propelling agent, namely, that the gellant should not interfere with the propelling characteristics of the propelling agent nor be destroyed by that agent. The gellant may be in either powder or liquid form, the powder preferably being very finely divided and the liquid preferably being non-aqueous. Thus, while it is possible to form a mixture of red fuming nitric acid and aqueous colloidal silica having the requisite flow behavior, the water contributes nothing to the combustion properties of the propellant and may even detract from those properties, so that powdered colloidal silica is preferable, and very finely powdered colloidal silica disperses in the liquid more easily and completely.

The expression "comprising" is used to define the components essential to the invention and does not exclude other components so long as they do not vitiate the purpose of the invention, it being known, for example, to add catalysts and/or water to liquid propellants for various reasons.

In order to achieve particular characteristics, the inorganic liquid propellant compositions of the present invention may comprise a mixture of gellants.

The amount of the gellant present in the inorganic liquid propellant compositions of the present invention should be at the lowest possible level which confers the desired characteristics upon the liquid propellant composition, it being understood that flow initiation can be adjusted for a given situation by the amount of gelling agent which is added. In all cases the major weight proportion of the inorganic liquid propellant composition should be the propelling agent. Generally, the weight proportion of the gellant will be less than ten percent, and preferably will range between approximately two weight percent and eight weight percent.

As heretofore indicated, surface-active materials may be utilized when desirable and if compatible. When used, such surface-active materials are generally present in the inorganic liquid propellant compositions of the present invention in relatively low weight percentages, which percentages are always less than the amount of the gellant and are generally less than one weight percent of the composition. Examples of suitable surface-active materials which might be used with fuels include sulfonates such as the alkyl sulfonates, fatty acid alcohol amine compounds, alkyl aryl polyether alcohols, ethylene oxide-fatty alcohol condensates, etc. For use with oxidizers, only those surface-active materials having oxidation resistance are suitable.

It is essential if optimum performance is to be achieved that substantially complete dispersion of the propelling agent and the gellant (and the surface-active material if it issued) be effected. This can be accomplished in many cases by "shear working" in conventional equipment. However, ultrasonic dispersion may be employed advantageously, especially in the case of compositions comprising, in addition to the gellant, inorganic liquid propelling agents to which are added solid fuel or oxidizer particles, in order to reduce dispersion time, reduce gel concentration, remove oxide coatings, etc.

It should be noted that the inorganic liquid propellant compositions of the present invention may comprise even the highly reactive inorganic propelling agents, such as red fuming nitric acid, chlorine trifluoride, and other oxidizers.

In the following illustrative examples, the order of addition of the components is generally not critical. It is necessary for substantially complete dispersion of the propelling agent and gellant to be achieved, but this can be accomplished under conditions set forth in each example.

Example I

Colloidal silica was gradually added to hydrazine until three weight percent had been added, the mixture being hand-stirred during the addition process, until at the end of two minutes of adding and stirring a gel was formed. It was determined that the mixture had a high viscosity at slow flow, while at high flow it had a low viscosity and was pumpable.

Example II

The procedure of Example I was duplicated except that in place of only hydrazine there was substituted a mixture in which the hydrazine was present to the extent of 75 weight percent and magnesium hydride coated with polyethylene in a diameter size range of 60 to 100 microns was present to the extent of 20 weight percent, while colloidal silica was present to the extent of five weight percent. The resultant mixture had a high viscosity at slow flow, while at high flow it had a low viscosity and was pumpable. At the end of several weeks of storage of this material, the magnesium hydride-polyethylene particles remained in suspension, there having been no appreciable settling.

Example III

A tenth of one weight percent of the sorbitan monooleate detergent was added to the propelling agent slurry of Example II prior to the addition of the gellant, and the complete mixture was agitated by subjection to ultrasonic agitation at a frequency of 20,000 cycles per second for one-half minute. It was determined that the resultant mixture had a high viscosity at slow flow, while at high flow it had a low viscosity and was pumpable.

Example IV

A mixture of 57.5 weight percent of hydrazine, 40 weight percent of ammonium perchlorate, and 2.5 weight percent of the colloidal silica described in Example I was hand-stirred for two minutes. It was determined that the resultant monopropellant had a high viscosity at slow flow, while at high flow it had a low viscosity and was pumpable.

Example V

Four weight percent of the colloidal silica used in Example I was gradually added to 96 weight percent of red fuming nitric acid during two minutes of hand-stirring. The resultant mixture had a high viscosity at slow flow, while at high flow it had a low viscosity and was pumpable. A stainless steel slug (density 7.7 g./cc.) was suspended in a quantity of this mixture for several weeks, indicating its rigidity under storage conditions.

Example VI

A mixture of 67 weight percent of red fuming nitric acid, 30 weight percent of ammonium perchlorate, a fractional weight percent of an oxidation-resistant fluorochemical anionic surfactant and approximately three weight percent of the colloidal silica described in Example I were hand-stirred for two minutes. The resultant mixture was a good dispersion which had a high viscosity at slow flow, while at high flow it had a low viscosity and was pumpable.

Example VII

A mixture of 74 weight percent of red fuming nitric acid, 23 weight percent of aluminum powder having a mass mean diameter of 8 microns, and three weight percent of the colloidal silica described in Example I was hand-stirred for two minutes. It was determined that the resultant monopropellant had a high viscosity at slow flow, while at high flow it had a low viscosity and was pumpable.

The compositions of the present invention have good storage characteristics, and when stored remain as high-viscosity materials for extended periods of time. As at high flow rates they are pumpable, the compositions of the present invention may be pumped from location to location and metered.

Satisfactory suspensions which do not settle are provided for the first time by the inorganic liquid propellant compositions of the present invention which include suspended solid particles.

Inasuch as the spillage and leakage risks are minimized with the compositions of the present invention, the same are superior to those of conventional liquid propellants in terms of safety and ease of handling.

The present invention may be embodied in other specific forms without departing from the spirit or essential attributes thereof and, accordingly, reference should be made to the appended claims rather than to the foregoing specification as indicating the scope of the invention.

There is claimed:

1. An inorganic liquid rocket propellant component composition having the property of being essentially unpourable under storage or low shear conditions and of becoming fluid and flowing under increased shear comprising a mixture of a major weight proportion of an inorganic liquid rocket propellant component selected from the group consisting of liquid hydrogen, liquid oxygen, liquid ammonia, and red fuming nitric acid and from two to ten weight percent of colloidal silica.

2. An inorganic liquid rocket propellant component composition in accordance with claim 1 which includes a minor weight percentage of a surface active agent.

3. An inorganic liquid rocket propellant component composition in accordance with claim 1 which contains dispersed finely divided particles of a solid rocket propellant component.

References Cited

UNITED STATES PATENTS

| | | | |
|---|---|---|---|
| 2,046,209 | 6/1936 | Ray | 44—7 |
| 2,570,990 | 10/1951 | Southern et al. | 44—7 |
| 2,807,565 | 9/1957 | Rush et al. | |
| 2,922,703 | 1/1960 | Baver et al. | 44—7 |

BENJAMIN R. PADGETT, Primary Examiner

U.S. Cl. X.R.

149—17, 18, 74